United States Patent [19]

Bowen

[11] 4,142,682
[45] Mar. 6, 1979

[54] SPRAY NOZZLE INSERT

[76] Inventor: Norman D. Bowen, 79 Portland St., Toronto, Ontario, Canada, M8Y 1A8

[21] Appl. No.: 770,883

[22] Filed: Feb. 22, 1977

[51] Int. Cl.² .............................................. B05B 1/34
[52] U.S. Cl. ................................... 239/488; 239/590
[58] Field of Search ............... 239/487, 488, 493, 590, 239/590.5

[56] References Cited

U.S. PATENT DOCUMENTS

| 2,647,799 | 8/1953 | Kinney | 239/487 |
| 3,104,829 | 9/1963 | Wahlin | 239/488 |
| 3,567,116 | 3/1971 | Lindlof | 239/487 X |

*Primary Examiner*—John A. Pekar
*Assistant Examiner*—Michael Mar
*Attorney, Agent, or Firm*—Rogers, Bereskin & Parr

[57] ABSTRACT

An insert is shown for a solid cone type spray nozzle as well as a method of making the insert. The insert has a central planar web having a rounded lower edge portion and a pair of obliquely oppositely disposed vanes located perpendicular to the web. The vanes have distal portions extending past the plane of the web and have recesses located adjacent to the distal portions to produce the required turbulent and swirling fluid motion inside the spray nozzle. The inserts are produced from bar stock by forming first and second parallel oblique grooves to define a vane between the grooves, and removing a portion of bar stock material from the peripheral edge portion of the second groove adjacent to the vane. The bar stock is rotated 180°, third and fourth parallel oblique grooves are formed crossing the first and second grooves, and a similar portion of bar stock is removed from the peripheral edge portion of the fourth groove. A second vane is thus formed between the third and fourth grooves. The insert is severed from the bar stock using a circular parting cutter.

6 Claims, 15 Drawing Figures

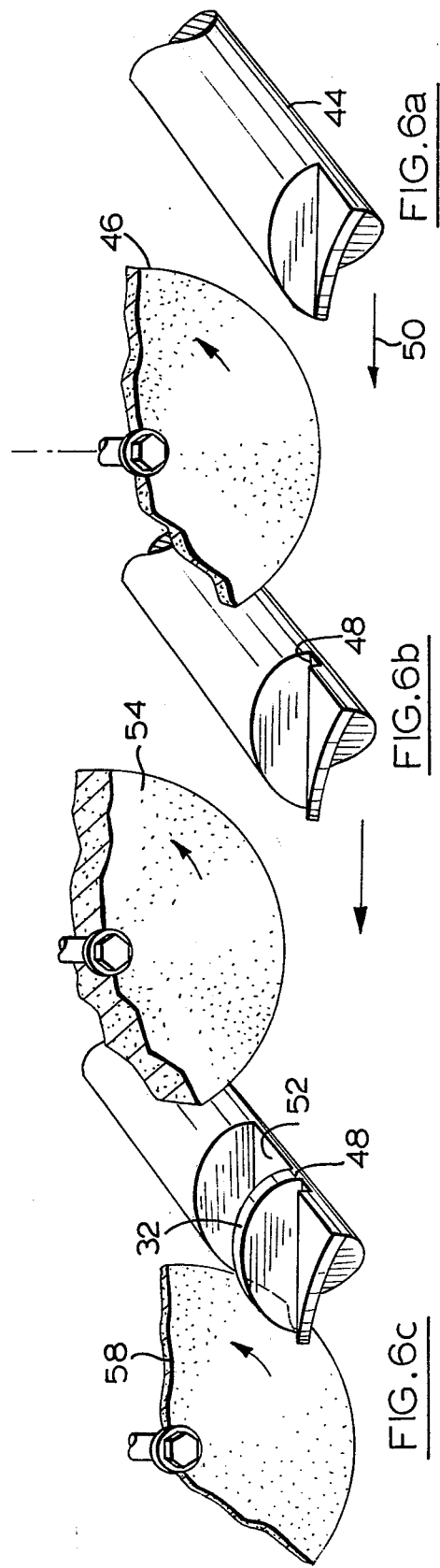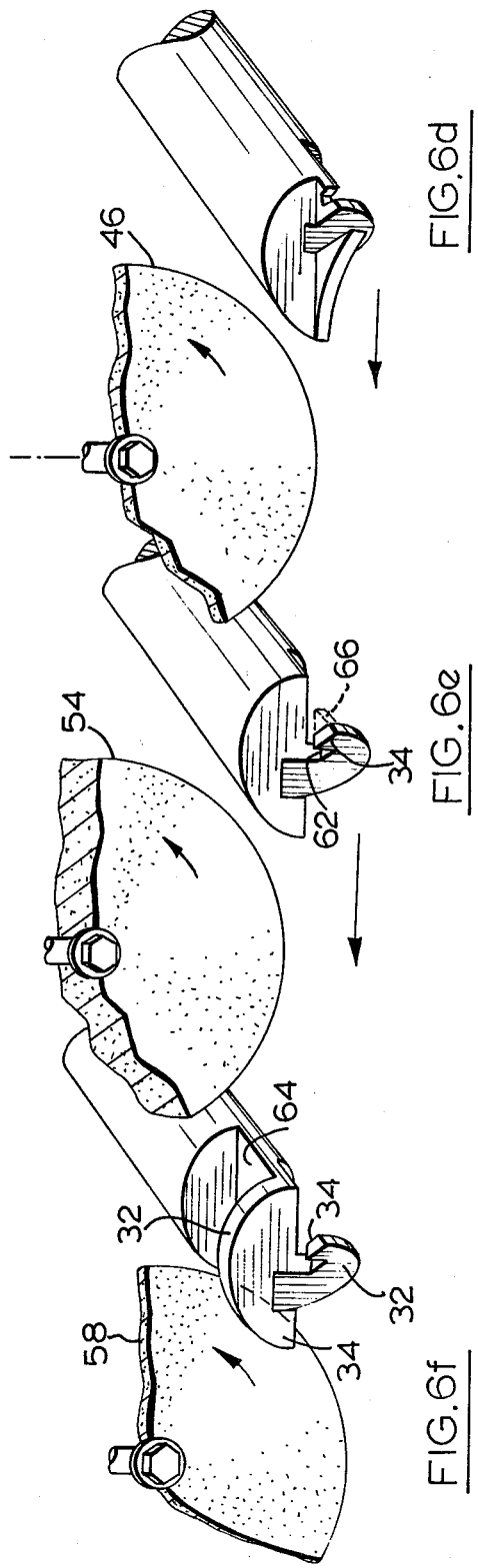

SPRAY NOZZLE INSERT

This invention relates to spray nozzles, and in particular to vaned nozzle inserts and methods of manufacturing same.

In solid or full cone spray nozzles, there are generally two demountable threadably connected nozzle elements, one having an output orifice and the other having a threaded fluid inlet for connection to a supply of fluid to be sprayed. An insert is located inside the nozzle and is retained therein by the demountable or disengagable nozzle elements. It is the insert that produces the desired turbulent and swirling motion in the fluid, so that the fluid forms a full cone upon leaving the output orifice. Of course, many different types of inserts can be made to produce different flow patterns from the nozzle, but the present invention is primarily concerned with full cone spray nozzles. The inserts for this type of nozzle typically have askew vanes that are formed with axially orientated openings or recesses for producing the required fluid motion.

An example of a solid cone nozzle insert produced in the past is shown in U.S. Pat. No. 3,104,829, issued to F. W. Wahlin (the corresponding Canadian patent is Canadian Pat. No. 691,210). A difficulty with these inserts is that the vane openings or recesses often become clogged or plugged as a result of dirt or other solids or impurities in the liquids being sprayed. This is a particularly acute problem in steel mills where liquid sprays are used to cool the steel, such as on continuous casting machines. If the cooling spray is blocked, the newly cast steel is not cooled uniformly, and a breakout of molten steel can occur from the casting.

In order to reduce the plugging problem, attempts have been made to enlarge the axial openings in the vanes. However, this usually produces non-uniform spray distribution or a reduction in the spray angle of the conical spray pattern.

The present invention permits the axial vane recesses to be enlarged to reduce the clogging problem. The vanes extend beyond the plane of the insert. This maintains sufficient fluid angular momentum inside the spray nozzle, so that a more uniform spray distribution results with a reduction in the tendency for clogging.

According to one aspect of the present invention, there is provided a vaned insert for a spray nozzle having a central planar web including a lower edge portion. A pair of vanes extends perpendicularly from opposed sides of the web so that the vanes are disposed in oblique crossing planes. The vanes have distal portions extending past the plane of the web, and the vanes define inwardly extending recesses located adjacent to the distal portions.

According to another aspect of the present invention, a method is provided for forming spray nozzle inserts from elongated bar stock. The method includes the steps of gripping the bar stock and forming a first oblique groove therein to a depth below the central plane of the bar stock. A second groove is formed in the bar stock parallel and substantially wider than the first groove to define a vane between the first and second grooves, the second groove extending to a depth above the central plane and having a forward peripheral edge portion. The bar stock is rotated 180° and third and fourth oblique grooves are formed substantially the same as, but crossing the respective first and second grooves, so that a pair of vanes are formed disposed in oblique crossing planes and having distal portions extending beyond the central plane. A portion of bar stock material is removed from the second and fourth groove peripheral edge portions adjacent to the vane, and the insert is severed by transversely cutting the bar stock through the second and fourth grooves.

A preferred embodiment of the invention will now be described, by way of example, with reference to the accompanying drawings in which:

FIG. 6a to FIG. 6f are diagrammatic perspective views illustrating various steps in the method of producing the insert shown in FIGS. 1 to 5;

Figure 1:
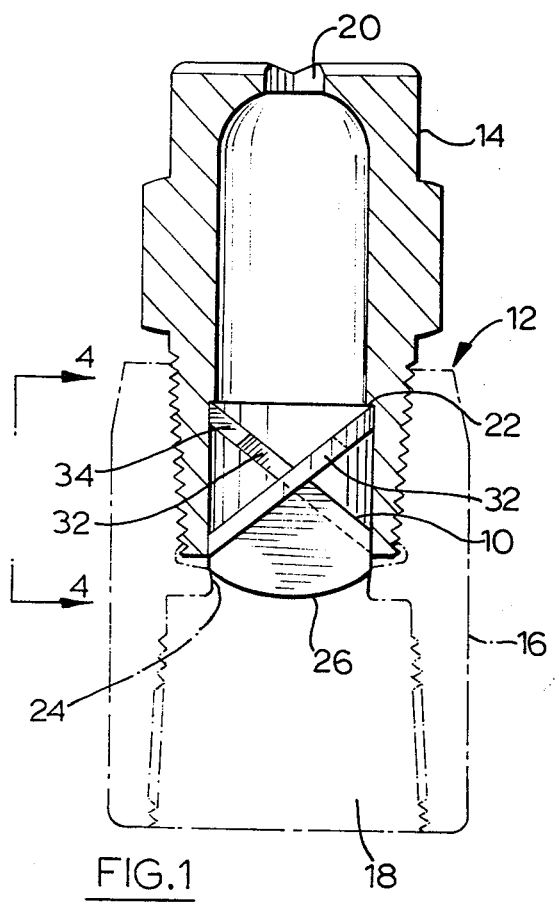
FIG. 1 is a cross-sectional view showing a spray nozzle with a preferred embodiment of a nozzle insert located therein.

Referring firstly to FIGS. 1 to 5, a preferred embodiment of a spray nozzle insert is generally indicated by reference numeral 10. In FIG. 1, insert 10 is shown located inside a spray nozzle 12 having an upper nozzle element 14 and a lower nozzle element 16 indicated by chain-dotted lines. Lower nozzle element 16 has an axial threaded opening 18 which serves as a fluid inlet passage and is adapted to be connected to a supply of liquid or other fluid to be sprayed. Lower nozzle element 16 is not necessary, however, and can be replaced by an ordinary threaded supply pipe or tube, if desired. Upper nozzle element 14 has an axial aperture 20 which serves as a fluid output passage from which a solid or full cone spray pattern emerges. Insert 10 is located inside upper nozzle element 14 and rests against an annular shoulder 22. Insert 10 is held in position by a press-fit, or it may be retained by an annular flange 24 in lower nozzle element 16 as shown in FIG. 1, if lower nozzle element 16 is used. In any event, insert 10 is not intended to rotate inside spray nozzle 12.

Figure 2:
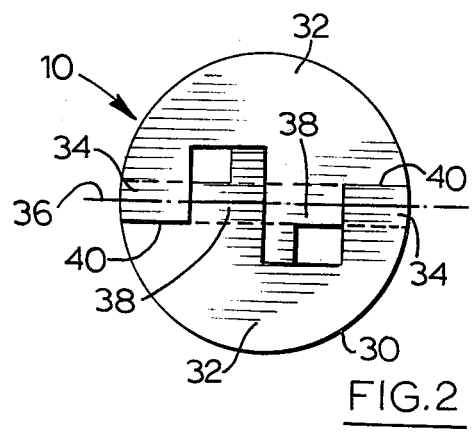
FIG. 2 is a top plan view of the insert shown in FIG. 1.
Figure 3:
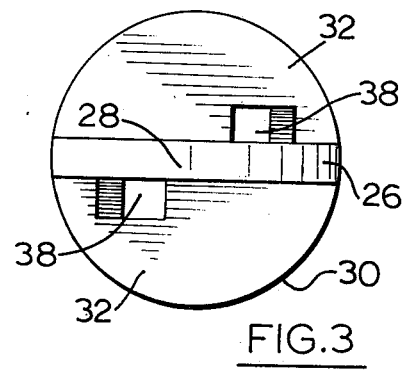
FIG. 3 is a bottom plan view of the insert shown in FIGS. 1 and 2.
Figure 5:
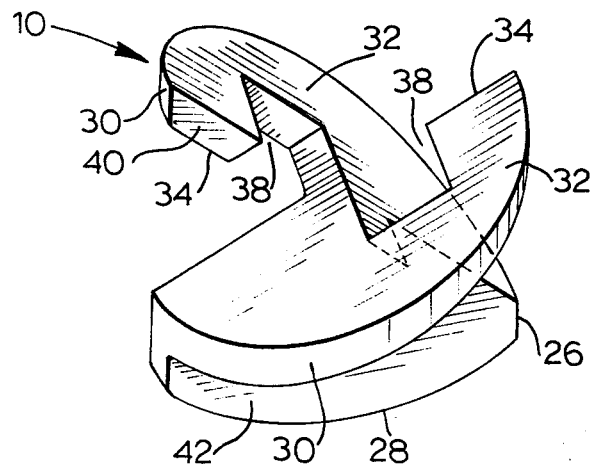
FIG. 5 is a perspective view of the insert shown in FIGS. 1 to 4.
Figure 4:
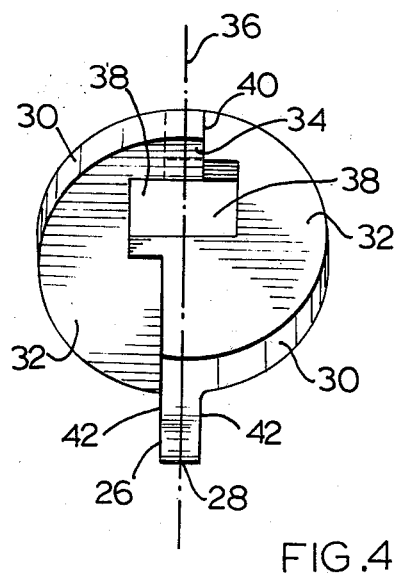
FIG. 4 is a side elevational view of the insert taken along lines 4—4 of FIG. 1.

Insert 10 has a central planar web 26 having a rounded lower edge portion 28. As seen in FIGS. 2 and 3, insert 10 is circular in plan view, the insert having generally cylindrical side portions 30. A pair of vanes 32 extends perpendicularly from opposed sides of web 26, the vanes being opposed in oblique crossing planes as shown best in FIGS. 1 and 5. Each vane has a distal portion 34 which extends past the plane of web 26, which plane is indicated by line 36 in FIGS. 2 and 4. Each vane also defines an inwardly extending recess 38 located adjacent to respective distal portions 34.

Insert 10 may be made in any convenient size, but the inserts are commonly formed from round bar stock having a diameter from 3/16 to 1¼ inches. Where for example, a ¼ inch diameter bar stock is used, insert 10 would be ¼ inch in diameter in plan view, and would typically be approximately 5/16ths of an inch in length. Recesses 38 are rectangular in shape, and have a depth and width which are approximately one quarter the width or diameter of insert 10. The distal portions 34 of vanes 32 extend beyond the plane 36 of the web or the insert, so that the end faces 40 of distal portions 34 generally lie in the same plane as the respective outer side surface 42 of web 26. As seen best in FIGS. 2 and 3, recesses 38 are sufficiently large to provide axially orientated openings through insert 10. These openings, together with the oblique orientation of vanes 32, and especially distal portions 34, serve to produce the required turbulence and angular momentum in the fluid passing through the nozzle, and thus the desired full cone spray pattern.

Figure 7:
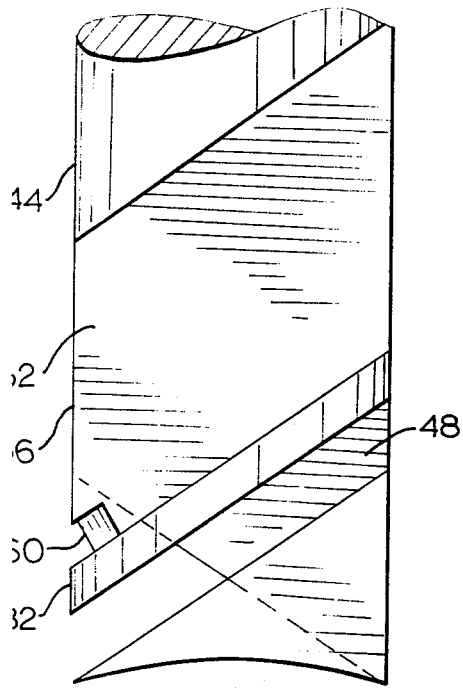
FIG. 7 is a top plan view of the bar stock after completing the step illustrated by FIG. 6c.
Figure 8:
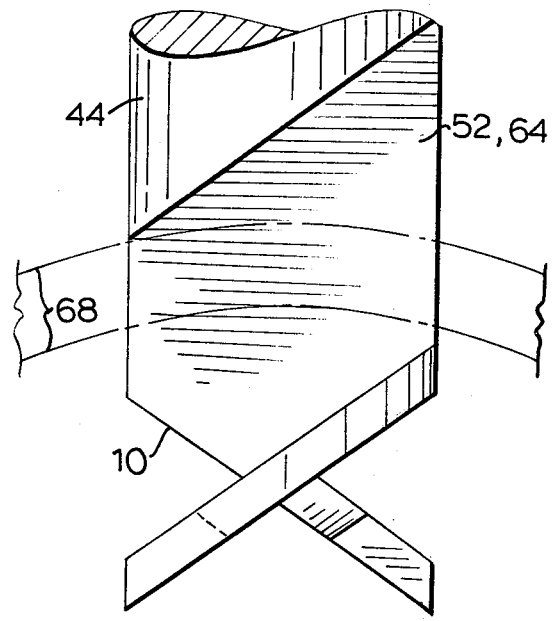
FIG. 8 is a top plan view of the bar stock illustrating the final cut-off step of the method illustrated in FIG. 6.

Referring next to FIGS. 6 to 8, the method of producing inserts 10 will be described. In these figures, a length of bar stock 44 is shown in various stages as the various steps are performed to produce an insert 10. It will be appreciated that this is a cyclical method, in that as the various operations are performed on an end of bar stock 44 to produce an insert 10, the bar stock is advanced and the operations repeated to produce a second, and thus subsequent inserts from the same piece of bar stock, as described further below.

In FIG. 6a, an end portion of a length of bar stock 44 is shown prior to the commencement of the production of an insert 10, but after previous inserts have been produced from this length of bar stock. In forming an insert 10, the bar stock 44 is gripped and held securely by a suitable chuck (not shown), and a milling or slotting cutter 46 passes obliquely over bar stock 44 to produce a first oblique groove 48 as shown in FIG. 6b. In the preferred method, milling cutter 46 is moved relative to bar stock 44, but for the purposes of illustration in FIGS. 6, bar stock 44 may be considered to move in the direction of arrow 50 past cutter 46. Cutter 46 forms a first groove 48 that extends below the horizontal central plane of bar stock 44. As will appear more clearly below, first groove 48 forms recesses 38 in vanes 32, and therefore cutter 46 is positioned and dimensioned to give the desired width and depth of recesses 38.

After first groove 48 is formed, a second groove 52 is formed by passing a second milling cutter 54 horizontally through bar stock 44. Second groove 52 is parallel and substantially wider than first groove 48 and is spaced from first groove 48 to define one vane 32 therebetween. Second groove 52 extends to a depth which is above the central plane of the bar stock, and as will appear more clearly below, the bottom surface of second groove 52 forms one of the side surfaces 42 of web 26. As seen best in FIG. 7, second groove 52 has a forward peripheral edge portion 56.

After second groove 52 is formed, a third milling cutter 58 partially engages bar stock 44 to remove a portion of the bar stock material or form a notch 60 (see FIG. 7) in the peripheral edge portion 56 adjacent to vane 32. The purpose of this notch 60 will be described further below.

After completion of first and second grooves 48, 52 and notch 60, bar stock 44 is rotated 180° to the position shown in FIG. 6d. Milling cutters 46, 54 are then used to cut respective third and fourth grooves 62, 64 as shown in FIGS. 6e and 6f. Third and fourth grooves 62, 64 are substantially the same as respective first and second grooves 48, 52, but grooves 62, 64 cross grooves 48, 52, so that a pair of vanes are formed which are disposed in oblique crossing planes and have distal portions 34 extending beyond the central plane of the bar stock. In FIG. 6f, as in FIG. 6c, milling cutter 58 is shown removing a portion of the bar stock material in the peripheral edge portion of fourth groove 64 adjacent to upper vane 32.

The purpose of third milling cutter 58 and the reason for forming notch 60 is illustrated in FIG. 6e where a triangular portion 66 of bar stock material is shown in dotted lines projecting horizontally from distal portion 34. Cutter 58 in effect removes this triangular portion 66 by forming notch 60 in the peripheral edge portion 56 of second groove 52. In FIG. 6f, cutter 58 removes a similar triangular portion (not shown) of bar stock in the forward peripheral edge portion of fourth groove 64.

Referring to FIG. 8, insert 10 is severed from bar stock 44 after the steps shown in FIG. 6 have been completed by transversely passing a circular parting cutter or hole saw through the second and fourth grooves 52, 64 as indicated by chain-dotted lines 68. Insert 10 then falls away and bar stock 44 is advanced to repeat the process and produce another insert.

Figure 9:
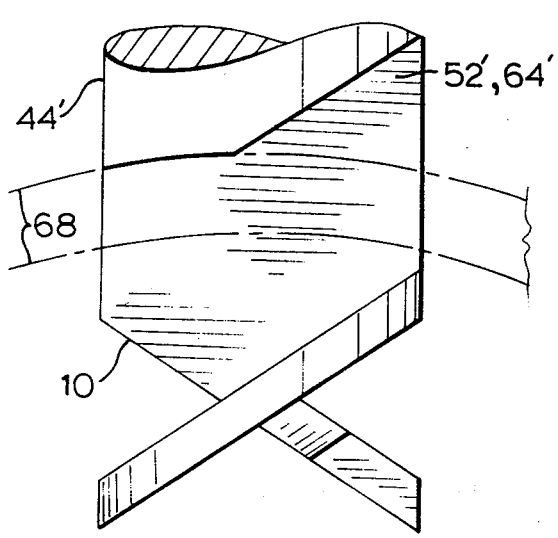
FIG. 9 is a top plan view of the bar stock similar to FIG. 8, showing another embodiment of the final cut-off step.
Figure 10:
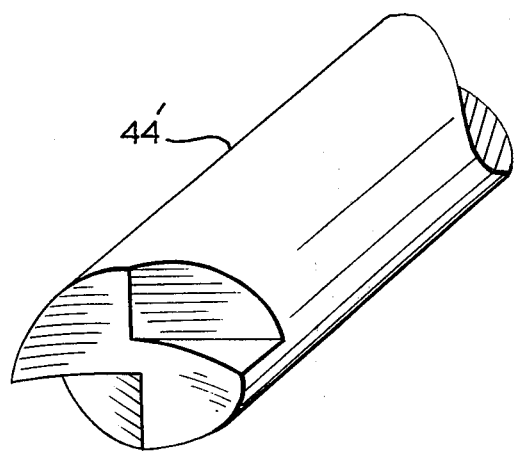
FIG. 10 is a perspective view similar to FIG. 6a showing the end of the bar stock where the cut-off method illustrated in FIG. 9 is used.

Referring next to FIGS. 9 and 10, an alternative embodiment of the cut-off step shown in FIG. 8 is illustrated. In this embodiment, second and fourth grooves 52', 64' are somewhat narrower than grooves 52, 64 shown in FIG. 8 and the parting cutter indicated by dotted lines 68 removes a portion of the bar stock 44' adjacent to grooves 52', 64'. This results in an end portion of bar stock 44' as shown in FIG. 10. Bar stock 44' and the method represented thereby may be used in the same manner as bar stock 44 shown in FIG. 6 without any change. In fact, the parting method of FIGS. 9 and 10 may be preferred in some cases depending upon the sizes of the cutters and the insert being produced, since it may result in less wastage of bar stock material.

Having described preferred embodiments of the spray nozzle insert and method of producing this insert, it will be appreciated that various modifications may be made to the structure and method described. For example, although standard milling cutters are used to form the grooves, other types of cutting devices such as grinding wheels could be used if desired. In the method described above, the cuts are shown to be made from above the bar stock, but of course the cuts can be done below using cutters mounted below the horizontal plane of the bar stock. It will be apparent that cutters 46, 54 and 58 could all be of the same diameter having their axes located at different levels, or the cutters could be of different sizes having their axes mounted at the same level if desired. It will also be apparent that the various grooves and notches could be formed in a different order than that described above, and that some cuts, such as the first and second grooves, and the third and fourth grooves could be made simultaneously. Similar, triangular portions 66 could be removed after all of the first to fourth grooves have been formed.

The material primarily used for making insert 10 is brass, although other materials, such as stainless steel or mild steel could be used depending upon the particular application or type of fluid being sprayed. Also, although round bar stock is used primarily, it would be possible to use square stock to produce square inserts if desired. Finally, the oblique angles of the vanes can be altered as well as the relative dimensions of the various elements of the insert, as desired.

It will be appreciated that the present invention provides a spray nozzle insert that is simple to produce using standard cutting or milling apparatus that is easy to set up and operate. The inserts so produced are relatively inexpensive and have a reduced tendency to clog without unduly sacrificing uniformity of spray pattern.

What I claim as my invention is:

1. A vaned insert for a spray nozzle, the insert comprising: a central planar web having a lower edge portion; a pair of vanes extending perpendicularly from opposed sides of the web, the vanes being disposed in oblique crossing planes; each vane having a distal portion disposed in co-planar relationship with the remainder of the vane and extending past the plane of the web, and said vanes defining inwardly extending recesses located adjacent to said distal portions.

2. A vaned insert as claimed in claim 1 wherein said lower edge portion is rounded.

3. A vaned insert as claimed in claim 1 wherein said inwardly extending recesses are generally square in shape, the width of said recesses being generally one quarter the width of the insert.

4. A vaned insert as claimed in claim 3 wherein the web is flat and of generally uniform thickness.

5. A vaned insert as claimed in claim 3 wherein said vanes are generally flat.

6. A vaned insert as claimed in claim 2 wherein said insert is cylindrical in plan view.

* * * * *